(12) United States Patent
Hsu et al.

(10) Patent No.: US 7,931,972 B2
(45) Date of Patent: Apr. 26, 2011

(54) ELASTOMERIC EMULSION POLYMERS FOR MASONRY COATINGS

(75) Inventors: Shui-Jen Raymond Hsu, Westlake, OH (US); Elizabeth Blankschaen, Broadview Heights, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 1028 days.

(21) Appl. No.: 11/737,905

(22) Filed: Apr. 20, 2007

(65) Prior Publication Data
US 2007/0248837 A1    Oct. 25, 2007

Related U.S. Application Data
(60) Provisional application No. 60/793,853, filed on Apr. 21, 2006.

(51) Int. Cl.
*B32B 13/12* (2006.01)
*B32B 27/18* (2006.01)
*B32B 27/30* (2006.01)

(52) U.S. Cl. .................................. 428/451; 428/522

(58) Field of Classification Search .................. 428/451, 428/522
See application file for complete search history.

(56) References Cited

U.S. PATENT DOCUMENTS

| | | | |
|---|---|---|---|
| 4,340,524 A | 7/1982 | Bullman | |
| 4,897,291 A | 1/1990 | Kim | |
| 5,352,531 A | 10/1994 | Roberts et al. | |
| 6,060,532 A | 5/2000 | Frankel et al. | |
| 6,235,814 B1 | 5/2001 | Bowe | |
| 6,254,985 B1 | 7/2001 | Gerst et al. | |
| 6,258,887 B1 | 7/2001 | Bardman et al. | |
| 6,787,585 B2 * | 9/2004 | Rose et al. ................ | 523/135 |

FOREIGN PATENT DOCUMENTS
JP    2006199841 A    8/2006
* cited by examiner

*Primary Examiner* — D. S Nakarani
(74) *Attorney, Agent, or Firm* — Samuel B. Laferty

(57) ABSTRACT

Acrylate latexes are described which provide properties of good balance of moderate elongation, low dirt pick up, alkaline resistance, UV light resistance, and efflorescence resistance for masonry coatings. These latexes have a large portion of repeating units from C8-C12 alcohol esters of acrylic acid and/or vinyl versatates along with 5-15 weight percent of repeating units from acrylonitrile. They have a glass transition temperature of −50 to +10° C.

10 Claims, No Drawings

ELASTOMERIC EMULSION POLYMERS FOR MASONRY COATINGS

CROSS REFERENCE TO RELATED APPLICATION

This application claims the benefit from U.S. Provisional Application Ser. No. 60/793,853 filed on Apr. 21, 2006.

FIELD OF THE INVENTION

This invention relates to elastomeric masonry coatings with a balance of elongation to break, good water resistance, good efflorescence resistance, low dirt pick up, good alkaline resistance and good UV light resistance. The coatings comprise a polymer from a major amount of alkyl (alk)acrylate monomers where the alkyl is from C8 to C12 and/or vinyl esters of C5-C12 versatic acids. The "alk" may be present or absent and is lower alkyl group such as meth. The glass transition temperature of the polymer/elastomer is below 20° C. and thus a crosslinker effective after film formation may be used to minimize dirt pick up.

BACKGROUND OF THE INVENTION

When surfaces such as concrete, brick, masonry, stone, etc., are treated with waterproofing sealer compositions, they get overall protection from corrosion and general deterioration. The treatment reduces the rate of water absorption considerably, thereby preventing water related damage. There are many sealers/repellents known to the prior art. For example, acrylics, vinyls, silanes, silicones, polyurethanes, styrene-butadiene copolymers, silicates, siloxanes, siliconates, etc. They are either water based or solvent based or blends thereof.

One prior art technique for waterproofing architectural components included spreading asphaltic or bituminous materials over the masonry substrates and allowing the asphaltic or bituminous materials to harden to form water-resistant layers. One drawback to this technique was that the water-resistant layers formed in this manner were prone to cracking as the underlying architectural components themselves expanded, contracted or cracked. Such cracking of the water-resistant layers provided water-conducting channels through the layers, thereby compromising the value of the layers as waterproofing.

Masonry has an ability to go in to construction where bare metal or untreated wood often would not perform as well. Masonry is sometimes installed below soil level, in direct contact with standing water, or subjected to foot or vehicle traffic, etc. While metal or wood coatings are acceptable for masonry in some applications where basic water-repellant barrier properties are sufficient, other uses of masonry require an optimized coating. Some masonry substrates impart alkaline pH to moisture or water that directly interacts with the masonry. This alkaline pH and the ions associated with it impart the efflorescence effect where soluble salts deposit on the structure or coating when the water carrying solubilized salts evaporates. Interaction of water, masonry, and coatings can also cause coating adhesion failures and cracking and crumbling of the masonry (especially in environments where the water can freeze and expand). When masonry coatings have enough elasticity to cover cracks in underlying masonry substrates, they often suffer from tacky surfaces that allow dirt and grime to adhere and bind itself into the coating. This typically results in a phenomenon called high dirt pick up.

U.S. Pat. No. 4,897,291 discloses a sealer composition for wood products comprising an aqueous vehicle, a water-based emulsion of a styrene-butadiene copolymer, a carboxylated styrene-acrylic copolymer, a paraffin wax, and a water-soluble methyl siliconate. U.S. Pat. No. 4,340,524 teaches addition of a hydrophobic resin in a non-gelling organic solvent into acrylic latex to improve its water resistance after a short cure period.

U.S. Pat. No. 5,352,531 proposed a solvent mixture of petroleum distillate and toluene used to dissolve a hydrocarbon resin and block copolymers of styrene and butadiene. The solution was applied to newly constructed basement walls to provide a water-resistant elastomeric coating on the walls. U.S. Pat. No. 6,060,532 discloses a thermoplastic elastomeric binder composition containing a multi-staged emulsion polymer and a photosensitive composition. The elastomeric composition can be used in an elastomeric coating, caulk, or sealant. Data was shown on the effect of multi-staged emulsion polymer and of benzophenone on the dirt pickup.

U.S. Pat. No. 6,235,814 discloses use of polymer in masonry applications such as cement modifiers, cement roof tile modifiers, cement roof tile slurry coatings, and cement roof tile coatings. The compositions utilized provided improved water absorption and water vapor transmission rates as well as improved flexural strength. The claims mentioned the polymer had 20-100 parts of at least one C12 to C40 alkyl ester of (meth)acrylic acid.

U.S. Pat. No. 6,258,887 discloses a dirt pickup resistant coating binder comprising a multi-stage emulsion-polymer suitable for use in dirt pickup resistant coatings. The multi-stage polymer included a first polymer with a Tg of 15 to 105° C. and a second polymer with a Tg of −55 to 30° C., the second polymer having a different composition from the first polymer.

U.S. Pat. No. 6,254,985 suggests a desirable pressure-sensitive adhesive comprises a copolymer composed of a) 60-95 wt. % a mixture containing at least one C4 alkyl acrylate and at least one C6-C12 alkyl acrylate, b) 3 to 30 wt. % ethylenically unsaturated compounds having a glass transition temperature of above 0° C., c) 0-10 wt. % ethylenically unsaturated compounds have at least one acid or acid anhydride group, and d) 0-20 wt. % further ethylenically unsaturated compounds.

SUMMARY OF THE INVENTION

A single polymer elastomeric coating is described utilizing a substantial amount of repeating units from C8-C12 alkyl acrylate monomers and/or vinyl esters of C10-C12 versatic acids, along with 5-15 weight percent acrylonitrile, and optional other monomers. It provides sufficient long term elasticity to bridge cracks in the masonry substrate while forming a tack free surface that exhibits low dirt pick-up. It is resistant to alkalinity such that it resists efflorescence and withstands contact with alkaline water which tends to degrade other films to friable or water dispersible polymer. It optionally contains a UV activated photosensitive species such as one containing benzophenone groups. It optionally contains silane adhesion promoters. It optionally has limited amounts of mono and polycarboxylic acid repeat units and limited amounts of styrenic monomers.

DETAILED DESCRIPTION OF THE INVENTION

In accordance with the invention, an elastomeric coating where a significant portion of the polymeric binder is repeating units from at least one C8-C12 alkyl acrylate and/or vinyl esters from C5-C12 versatic acids (more desirably C10-C12 versatic acids), about 5 to about 15 wt. % of the binder is repeating units from acrylonitrile, less than about 5 wt. % of the repeating units include mono or poly carboxylic acids, and the significant portion of the polymeric binder has a glass transition temperature of from about −50 or −40 to about +10° C. Optionally, the elastomeric coating is preferentially cross-liiked near the exterior surface via a free radical mechanism utilizing a UV activated free radical species. Optionally, the coating includes a silane coupling agent that is capable of being reactive with inorganic species via a silanol mechanism and which can react with the polymeric binder via a carbon to carbon double bond in the silane coupling agent.

The polymeric binder has been carefully chosen to result in alkali resistance, stability to UV exposure, elastomeric crack spanning ability, low dirt pick-up, water resistance, efflorescence resistance, and appearance. Commodity acrylate polymers do not offer all of these properties. Specialty acrylate polymers with high amounts of large alkyl groups on the acrylate also do not offer all of these properties. While the polymeric binder alone provides good properties with many masonry substrates, the two optional components of UV activated free radical source and silane coupling agent are very beneficial when extremely low dirt pick-up or hard to adhere masonry surfaces are encountered.

Definitions

In this document, "elastomer" is a generic term used to describe a polymer or polymer blend, optionally with typical coating additives such as fillers, pigment, etc., that is, capable of deforming at least 50% as a film and returning to substantially its original shape after the applied stress is removed.

"Wt. %" means the number of parts by weight of ingredient per 100 parts by weight of composition or material of which the ingredient forms a part.

"Aqueous medium" means a composition containing a substantial amount of water. It may contain other ingredients as well.

"Film" or "coating" generally means three dimensional shapes that form a protective barrier or layer. It is often characterized as having one very small dimension, thickness, and two large dimensions, length and width, especially when derived from a coating process such as painting. In this application, film will also be used to refer to other thicker protective barriers such as caulks and filler.

In chemical names this disclosure will use "( )" such as "(meth)", "(alk)", or "(alkyl)" to indicate that the particular substituent is optionally present but may be absent.

The compositions of the invention can be applied to any masonry substrate, particularly architectural materials where appearance and durability is a concern. Masonry to which the coating compositions can be applied includes brick, miscellaneous masonry, concrete, blends of concrete or mortar and aggregate, stone, tile and stucco. The term masonry used herein is meant to describe any substantially inorganic substrate, particularly building compositions and includes, but is not limited to, structural materials such as common brick, paving brick, face brick, drain tile, hollow block, cinder block, glazed brick or tile, terra cotta, conduits, roofing tile, ceramic tile, flue lining, mortar, cements such as Portland cement, gypsum products (optionally calcined) (e.g., molding, building plaster and stucco), marble, limestone, magnesia cement, and insulation products such as electrical and thermal insulators (diatomaceous earth brick.).

The elastomeric coating of this disclosure is comprised of at least one polymer binder. A majority such as at least 50 wt. %, in one embodiment, at least 75 wt. % in another, and in another at least 80 or 90 wt. % of the polymeric binders of the elastomeric coating is at least one polymer with acrylate repeating unit of C8-C12 (in one embodiment C8-C11) as described below. The residual polymer binder of the coating can be other polymeric binders which are sufficiently compatible with the polymeric binder from C8-C12 acrylate and/or vinyl esters of C10-C12 versatic acid repeating units and which do not significantly interfere with the function of the elastomeric coating in providing low dirt pick-up, crack spanning and efflorescence resistance.

The polymer from C8-C12 (in one embodiment C8-C11) acrylate and vinyl esters of C5-12 (in one embodiment C10-C12) versatic acid monomers has a balance of oleophilic and hydrophilic properties. The C8-C12 groups, which would normally be considered derived from the alcohol portion of the esterification reaction of acrylic acid with an alcohol, provide substantial oleophilic nature to the polymer. The vinyl esters from C5-C12 (in one embodiment C10-C12) versatic acids are the esters of $CH_2$=CH—OH with the various versatic acids. The versatic acids are typically described as trialkyl substituted acetic acid. The vinyl esters can be characterized as trialkyl substitution on the $CH_3$ of the acetic acid portion of vinyl acetate. The vinyl esters of versatic acids were available from Shell Chemical as Veova and are currently available from Hexion under the same trademark. The versatic acids and their vinyl esters are also described in the Encyclopedia of Chemical Technology, Fourth Edition, ©1993, volume 5, pages 192-203, published by John Wiley & Sons. They also help with getting the optimum glass transition temperature as larger alkyl groups in this portion of an alkyl acrylate or versatic acid tend to lower the glass transition temperature. Desirably from about 30 to about 85 wt. %, in one embodiment about 40 _or 45 to about 80 wt. % of the C8-C12 acrylate polymer and vinyl ester of C10-C12 versatic acid is repeating units from C8-C12 (in one embodiment C8-C11) acrylate monomers and/or vinyl esters of versatic acid. These C8-C12 acrylate monomers may optionally have meth or eth alkyl substitution on the beta carbon of the double bond of the monomer, but in one embodiment are non- meth and non-eth substituted acrylates (e.g., not C8-C12 meth or ethacrylate). In one embodiment the C8-C12 acrylate polymer and vinyl ester of C10-C12 versatic acid is substantially free of (less than 5 wt. %, less than 1 wt. % or less than 0.5 wt. %) or free of vinyl esters of C5-C12 (or C10-C12) versatic acid and thus is primarily comprised of C8-C12 alkyl acrylates as already described and other monomers as described later. Preferred C8-C12 acrylate monomers are octyl acrylate, nonyl acrylate, decyl acrylate, undecyl acrylate and dodecyl acrylate, and still more preferred are branch C8-C12 acrylates such as 2 ethylhexyl acrylate, 3,5,5-trimethylhexyl acrylate, isodecylacryalte, etc. In one embodiment, ethylhexyl acrylate is the preferred acrylate. A preferred vinyl ester of C10-C12 versatic acid is the composition primarily of C11 or C9 versatic acid.

Another component required in the C8-C12 acrylate polymer and/or vinyl ester of versatic acid is acrylonitrile, optionally substituted, in an amount from about 5 to 15 wt. %, and in another embodiment from 7 to 13 or 15 wt. % of the repeating units of the polymer. This is an average weight percent and some portions of the polymer could have slightly higher amounts and other portions slightly lower if the average amount for the entire polymer composition falls within the range. Generally, the acrylonitrile will be non-substituted, but a portion could be substituted by a lower alkyl group such as methyl or ethyl. The acrylonitrile contributes to a higher glass transition temperature (which may lower dirt pick-up) and good solvent resistance.

The residual monomers or repeating units in the C8-C12 acrylate polymer (other than C8-C12 acrylates) and vinyl ester of versatic acid can be chosen from a multitude of other unsaturated monomers that copolymerize with acrylates and acrylonitrile. Desirably, the other monomers or repeating units comprise less than 70 wt. % of the total repeating units in the acrylate monomer, in another embodiment less than 60 wt, % and in still other embodiments less than 55, 50, 40, 30 or 20 wt. %. In one embodiment, preferred co-monomers to the specified monomers are the various C1 to C7 (alk) acrylates (where (alk) means an alkyl substitutent such as meth or eth is optionally present) such as methyl, ethyl, propyl, butyl, t-butyl, etc., acrylate. Other acrylates with heteroatoms or other functional groups may be present such as cyanoacrylates, epoxyalkyl (alk) acrylates such as glycidyl methacrylate, or hydroxyalkyl (alk) acrylates where the alkyl is selected from C2 to C5 or C10 alkyl groups and alk is selected from C1 to C5 or C10 groups, such as hydroxyethylmethacrylate or similar monomers. In one embodiment t-butyl acrylate is preferred. In another embodiment, blends of methyl mnethacrylalte and t-butyl methacrylate are preferred.

Another component optionally present is styrene or other aromatic group containing monomers or repeat units (e.g., (alkyl)-alpha-methyl styrene, divinylbenzene, paramethylstyrene, etc.). Desirably, the repeating units or monomers containing an aromatic group such as styrene are present in amounts less than 15 wt. %, in another embodiment less than 5 or 8 wt. %, and in yet another embodiment less than 1, 2, or 3 wt. %.

Another component optionally present is repeating units of mono or polycarboxylic acid groups (other than esters of said carboxylic acids). These are present in amounts less than 5 wt. % on average based on the weight of said and in another embodiment less than 3 wt. %, and still another embodiment less than 1 wt. % (e.g., acrylic acid, methiacrylic acid, crotonic acid, itaconic acid, fumaric or maleic acid, etc.). In another embodiment, the polymer may include repeating units derived from unsaturated monomers containing phosphonic acids, suphonic acids like AMPS, and their salts. Other repeating units may be derived from monomers selected from vinyl acetate and vinyl monomers such as vinyl chloride or vinylidene chloride, N-vinyl pyrolidone, acrylamides, substituted acrylamides, vinyl ethers, etc.

The binder of the coating desirably has a glass transition temperature from about −50 or −40° C. to about +10° C. In another embodiment, the glass transition temperature is from about −40 to about 0C. In one embodiment, the binder has less than 5 or 10 wt. % polymer with a glass transition temperature outside of these ranges.

The polymer of the binder can be made by any polymerization method. Emulsion polymerization is preferred in one embodiment. The emulsion polymerization techniques used to prepare such emulsion polymer binders are well known in the art.

The monomers may be emulsified with an anionic, cationic, or nonionic surfactant or dispersing agent, or compatible mixtures thereof such as a mixture of an anionic and a nonionic surfactant, using, for example, from about 0.05% to about 5% by weight of a surfactant or dispersing agent based on the weight of the monomer. Suitable cationic dispersion agents include lauryl pyridinium chloride, cetyldimethyl amine acetate, and alkyldimethylbenzylammoniuin chloride, in which the alkyl group has from 8 to 18 carbon atoms. Suitable anionic dispersing agents include, for example, alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium t-octylphenoxypolyethoxyethyl sulfate, having 1 to 5 oxyethylene units, and the like. Suitable non-ionic dispersing agents include, for example, alkyl phenoxypolyethoxy ethanols having alkyl groups of from about 7 to 18 carbon atoms and from about 6 to about 60 oxyethylene units such as, for example, heptyl phenoxypolyethoxyethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers such as hydroxyethyl cellulose, methyl cellulose, polyacrylic acid, polyvinyl alcohol, and the like, may be used as emulsion stabilizers and protective colloids.

Initiation of the emulsion polymerization may be carried by the thermal decomposition of free radical precursors which are capable of generating radicals suitable for initiating addition polymerization such as, for example, ammonium or potassium persulfate, azo initiators such as AIBN, alkyl peroxydicarbonates, etc. Alternatively, such free radical precursors may be used as the oxidizing component of a redox system, which also includes a reducing component such as potassium metabisulfite, sodium thiosulfate, or sodium formaldehyde sulfoxylate. The free radical precursor and reducing agent together, referred to as a redox system herein, may be used at a level of from about 0.01% to 5%, based on the weight of monomers used. Examples of redox systems include t-butyl hydroperoxide/sodium formaldehyde sulfoxylate/Fe(III) and ammonium persulfate/sodium bisulfite/sodium hydrosulfite/Fe(III). The polymerization temperature may be from about 20° C. to about 95° C.

The polymerization may be initiated in the presence of a small particle size preformed emulsion polymer (e.g. seed polymerization), or unseeded. Seeded polymerization tends to yield aqueous dispersions of latex polymer having more uniform particle size than unseeded polymerization.

Chain transfer agents may be used to control molecular weight and include mercaptans, polymercaptans, alcohols, and halogen compounds used in the polymerization mixture in order to moderate the molecular weight of the polymeric binder. Generally, from 0% to about 3% by weight, based on the weight of the polymeric binder, of C4-C20 alkyl mercaptans, mercaptopropionic acid, or esters of mercaptopropionic acid, may be used. The weight average molecular weight of the polymer stages, as measured by gel permeation chromatography is generally from about 100,000 to 10,000,000.

The polymerization can be batch, continuous, staged, or any other method. Each stage of a staged process may incorporate thermal or redox initiation of polymerization. A monomer emulsion containing all or some portion of the monomers to be polymerized in a given stage may be prepared using the monomers, water, and emulsifiers. A solution of initiator in water may be separately prepared. The monomer emulsion and initiator solution may be co-fed into the polymerization vessel over the course of the emulsion polymerization of any stage of the process. The reaction vessel itself may also initially contain seed emulsion and further may additionally contain an initial charge of polymerization initiator. The temperature of the contents of the reaction vessel may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the monomer emulsions are co-fed may be altered during the emulsion polymerization process. After addition of the first monomer emulsion(s) has been completed, the polymerization reaction mixture may be held at some temperature for a time and/or treated with a polymerization inhibitor prior to polymerization of the subsequent monomer emulsion(s). Similarly, after addition of the final monomer emulsion(s) has been completed, the polymerization reaction mixture may be held at some temperature for a time and/or treated with a polymerization inhibitor before cooling to ambient temperature.

The polymer of this invention can be combined with commercial polymers and polymer dispersions by methods well known to those skilled in the art. The polymer of this invention can also be used for forming hybrids with other polymers such as urethanes or silicones. This can be done by polymerizing additional monomers by emulsion or suspension polymerization in the presence of these polymers, blending these polymers with other preformed polymers, or polymerizing the polymers of this disclosure in the presence of other polymers.

Adjuvants useful in the preparation of the polymer binder and/or in its subsequent use and which may be added during or subsequent to the polymerization reaction may include auxiliary surfactants; defoamers such as, for example, SURFYNOL 104E and Nopco NXZ used at a level from about 0.001 to about 0.1%, by weight based on the weight of the monomer mixture; leveling agents such as, for example, Sag® Silicone Antifoam 47 used at a level from about 0.001 to about 0.1%, by weight based on the weight of the monomer mixture; antioxidants such as, for example, MAROXOL 20 and IRGANOX 1010 used at a level from about 0.1 to about 5%, by weight based on the weight of the monomer mixture; plasticizers such as, for example, FLEXOL® plasticizer; and preservatives such as, for example, KATHON®, and PROXEL® GXL used at a level of 5-250 ppm.

Coating compositions of the present invention optionally comprise one or more coupling agents such as organo-silane coupling agents, transition metal coupling agents, phosphonate coupling agents, aluminum coupling agents, amino-containing Werner coupling agents, and mixtures of any of the foregoing. These coupling agents typically have dual functionality. Each metal or silicon atom has attached to it one or more groups which can either react with or compatibilize an inorganic or metal oxide surface and/or the components of the coating/binder. As used herein, the term "compatibilize" means that the groups are chemically attracted, but not bonded, to the inorganic surface and/or the components of the coating composition, for example by polar, wetting or solvation forces. In one non-limiting embodiment, each metal or silicon atom has attached to it one or more hydrolyzable groups that allow the coupling agent to react with the inorganic surface, and one or more functional groups that allow the coupling agent to react with the coating or binder.

Examples of hydrolyzable groups include: the monohydroxy arid/or cyclic $C_2$-$C_3$ residue of a 1,2- or 1,3 glycol, wherein $R^1$ is $C_1$-$C_3$ alkyl; $R^2$ is H or $C_1$-$C_4$ alkyl; $R^3$ and $R^4$ are independently selected from H, $C_1$-$C_4$ alkyl or $C_6$-$C_8$ aryl; and $R^5$ is $C_4$-$C_7$ alkylene. Examples of suitable compatibilizing or functional groups include epoxy, glycidoxy, mercapto, cyano, allyl, alkyl, urethano, carbamate, halo, isocyanato, ureido, imidazolinyl, vinyl, acrylato, methacrylato, amino or polyamino groups.

Functional organo-silane coupling agents are preferred for use in the present invention. Examples of useful functional organo silane coupling agents include gamma-amninopropyltrialkoxysilanes, gamma-isocyanatopropyltriethoxysilane, vinyl-trialkoxysilanes, glycidoxypropyltrialkoxysilanes and ureidopropyltrialkoxysilanes. Preferred functional organo-silane coupling agents include A-187 gamma-glycidoxy-propyltrimnethoxysilane, A-174 gamma-methacryloxypropyltrimethoxysilane, A-1100 gamma-aminopropyltriethoxysilane silane coupling agents, A-1108 amino silane coupling agent and A-1160 gamma-ureidopropyltriethoxysilane (each of which is commercially available from CK Witco Corporation of Tarrytown, N.Y.). The organo silane coupling agent can be at least partially hydrolyzed with water prior to application.

The particles of the polymer are generally from about 80 to about 400 nanometers in diameter, as measured using a Brookhaven BI-90 Particle Sizer, which employs a light scattering technique or a Nicomp 380. Polymodal particle size distributions may be employed.

The polymer of the present invention can be used to make coatings, adhesives, and films for porous and non-porous substrates such as: masonry (preferred), papers, non-woven materials, textiles, leather, wood, metals, plastics (e.g., polypropylene, polyester, polyurethane), house wrap and other building materials, fiberglass, polymeric articles, and the like. As coating compositions, they may be applied by any conventional method including brushing, dipping, flow coating, spraying, and the like.

Other additives well known to those skilled in the art can be used to aid in preparation of the elastomeric coating of this invention. Such additives include stabilizers, defoamers, antioxidants (e.g., Irganox 1010), UV absorbers, carbodiimides, activators, curing agents, stabilizers such as carbodiimide, colorants, pigments, neutralizing agents, rheology modifiers (thickeners), non-reactive and reactive plasticizers, coalescing agents such as di(propylene glycol) methyl ether (DPM), waxes, slip and release agents, antimicrobial agents, surfactants such as Pluronic™ F68-LF and IGEPAL™ CO630 and silicone surfactants, metals, coalescents, salts, flame retardant additives (e.g., antimony oxide), dispersants, extenders, surfactants, wetting agents, plasticizers, waxes, antiozonants, and the like. They can optionally be added as appropriate before and/or during the processing of the polymer of this invention into finished products as is well known to those skilled in the art. They can be used in amounts as generally known in the art. Additives may also be used as appropriate in order to make articles or to treat other products (such as by impregnation, saturation, spraying, coating, or the like). The polymeric binder of this invention is desirably at least about 20 wt. %, preferably at least about 25 wt. % and more preferably at least about 30wt. % of the final coating being applied to a substrate.

Elastomeric compositions containing an emulsion polymer (polymeric binder) and a photosensitive composition are useful in coatings, caulks, and sealants where low temperature flexibility and dirt pickup resistance are required.

Multi-ethylenically unsaturated monomers such as, for example, allyl methacrylate, diallyl phthalate, 1,4-butylene glycol dimethacrylate, 1,6-hexanediol diacrylate, and the like, may be used at a level of 0.01-10% by weight, based on the weight of the polymeric binder.

A photosensitive composition contains a grouping capable of absorbing some portion of the solar light spectrum, e.g., activated by U.V. light. The photosensitive composition may be a photosensitive compound added to the emulsion polymer binder or to the elastomeric composition in the manner of an additive, or it may be a photosensitive oligomer or photosensitive polymer, or it may be a photosensitive grouping chemically incorporated into the emulsion polymer binder such as, for example, by copolymerization. Preferred photosensitive compounds are benzophenone derivatives used at a level of from about 0.01 to about 2.0 or 5.0% by weight, in one embodiment from about 0.01 or 0.05 to about 0.5, 1.0, or 2.0 wt. % and in another embodiment from about 0.05 to about 0.5 or 1.0 wt. % based on the weight of the polymer binder, wherein one or both of the phenyl rings may be substituted such as, for example, benzophenone, 4-methyl benzophenone, 4-hydroxy benzophenone, 4-amino benzophenone, 4-chloro benzophenone, 4-hydrocarboxyl benzophenone, 4,4'-dimethyl benzophenone, 4,4'-dichloro benzophenone, 4-carboxymethyl benzophenone, 3-nitro benzophenone, substituted phenyl ketones such as substituted phenyl acetophenones, and the like. More preferred is benzophenone or a 4-substituted (para-) benzophenone. Benzophenone itself is most preferred. Photosensitive groupings capable of being chemically incorporated may be present as copolymerized ethylenically unsaturated monomers which may be used at a level of about 0.5 to about 5%, by weight based on weight of the binder, such as are disclosed in U.S. Pat. Nos. 3,429,852; 3,574,617; and 4,148,987, hereby incorporated herein by reference. Additionally, allyl benzoylbenzoates and copolymerizable monomers incorporating pendant benzophenone radicals may be used.

The coatings, caulks, and sealants of this invention may be prepared by mixing the elastomeric binder with conventional components in high speed dispersion equipment such as a Cowles disperser, or a Sigma mill for caulks and sealants. The coatings, caulks, and sealants of this invention may be applied to a wide variety of architectural construction materials such as, for example, wood, concrete, metal, glass, ceramics, plastics, plaster, stucco, and roofing substrates such as asphaltic coatings, roofing felts, synthetic polymer membranes, and foamed polyurethane insulation; or to previously painted, primed, undercoated, worn, or weathered substrates.

The coatings, caulks, and sealants of this invention may be applied by a variety of techniques well known in the art such as, for example, air-assisted or airless spray, electrostatic spray, brush, rollers, mops, caulking guns, trowels, and the like.

EXAMPLE

The following example is presented to illustrate this invention:

Seed polymer #1 A seed latex having the composition of Table 1 was used to control particle number and size in later polymerizations. A monomer premix was made from some of the sodium bicarbonate, some of the water, about half of the surfactant, the methacrylic acid, the n-butyl acrylate and the methyl methacrylate. An initial reactor charge of water, part of the bicarbonate, part of the initiator, and the rest of the surfactant was made to a 3 liter reaction vessel. The contents were heated to 78° C. where it was maintained for the rest of the polymerization. The monomer premix and more initiator were metered in over several hours. A post polymerization charge of initiator and formaldehyde sulfoxylate was also used. The latex was then cooled, and filtered through a 100-micron cloth. The pH of the emulsion was adjusted to 8.5-9.0 with ammonium hydroxide. A charge of a preservative in water was then added.

TABLE 1

| | |
|---|---|
| Water | 1001 |
| Sodium bicarbonate | 4.0 |
| Ammonium salt of alkyl phenol ethoxylate sulfate (Rhodaplex CO-436) | 9.3 |
| Methacrylic acid | 11.7 |
| n-butyl acrylate | 420.3 |
| Methyl methacrylate | 468 |
| Sodium persulfate | 3.6 |
| t-butyl hydroperoxide | 0.36 |
| Sodium formaldehyde sulfoxylate | 0.54 |
| Ammonium hydroxide | To pH 8.5-9.0 |
| Preservative | 0.6 |

Seed polymer #2 was made same as seed polymer #1 except sodium salt of tridecyl ether sulfate (Rhodaplex EST-30) was used instead of ammonium salt of alkyl phenol ethoxylate sulfate (Rhodaplex CO-436).

Example #1

BA/2-EHA/MMA/AN/MAA/styrene=30/45/15/7/2/1

A monomer premix was made by mixing 594 grams of water, 2.2 grams of ammonium carbonate, 11.38 grams of ammonium salt of alkyl phenol ethoxylate sulfate (Rhodaplex CO-436), 44 grams of methacrylic acid, 330 grams of methyl methacrylate, 990 grams of 2-ethylhexyl acrylate, 154 grams of acrylonitrile, and 660 grams of n-butyl acrylate. Initiator A was made by dissolving 2.2 grams of ammonium persulfate in 22 grams of water. Initiator B was made by dissolving 4.4 grams of ammonium persulfate in 176 grams of water. About 704 grams of water and 142.55 grams of seed polymer #1 were charged to a 5-liter reaction vessel and heated to 84° C. Initiator A was then added to the reaction vessel, followed by proportioning the monomer premix to the reaction vessel over a period of about 3 hours. About 45 minutes after premix proportioning, initiator B was proportioned into the reaction vessel over a period of about 3 hours and 30 minutes. After completion of premix proportioning, 22 grams of styrene was proportioned into the reaction vessel followed by 126 grams of water flush. After completion of initiator B feed, the temperature of the reaction vessel was maintained at 84° C. for 30 minutes. The reaction vessel then was cooled to 57° C. A mixture of 6.86 grams of water, 2.51 grams of 70% t-butyl hydroperoxide, and 0.73 grams of 30% ammonium lauryl was added into the reaction vessel. After about 5 minutes, 46.2 grams of 4.76% sodium formaldehyde sulfoxylate solution was added to the reaction vessel. After 30 minutes, the reaction vessel was cooled to room temperature and filtered through 100-micron cloth. The pH of the product was adjusted to about 8.5 with ammonium hydroxide. 53 grams of 3.2% Proxel GXL, solution was added as a preservative.

Comparative Example #2

The emulsion polymer was made exactly the same as Example #1 except the monomer composition was BA/2-EHA/MMA/AN/MAA/styrene=45/30/15/7/2/1.

Example #3

The emulsion polymer was made exactly the same as Example #1 except the monomer composition was BA/2-EHA/MMA/AN/MAA/Acrylamide/styrene=30/45/15/7/1/1/1.

Comparative Example #4

The emulsion polymer was made exactly the same as Example #1 except the monomer composition was BA/AN/MAA/styrene=84/14/1/1.

Comparative Example #5

The emulsion polymer was made exactly the same as Example #1 except the monomer composition was BA/AN/MAA=91/7/2.

Example #6

The emulsion polymer was made exactly the same as Example #1 except the monomer composition was 2-EHA/MMA/AN/MAA/styrene=60.2/31.8/5/2/1.

Example #7

2-EHA/MMA/AN/MAA/styrene=78/4/15/2/1

The emulsion polymer was made exactly the same as Example #1 except the monomer composition was 2-EHA/MMA/AN/MAA/styrene=78/4/15/2/1.

Example #8

2-EHA/MMA/AN/MAA/styrene=75/7/15/2/1

A monomer premix was made by mixing 486 grams of water, 1.8 grams of ammonium carbonate, 18 grams of a sodium salt of tridecyl ether sulfate (Rhodaplex EST-30), 36 grams of methacrylic acid, 126 grams of methyl methacrylate, 1350 grams of 2-ethylhexyl acrylate, and 270 grams of acrylonitrile. Initiator A was made by dissolving 2.7 grams of ammonium persulfate in 18 grams of water. Initiator B was made by dissolving 4.5 grams of ammonium persulfate in 144 grams of water. About 558 grams of water and 116.6 grams of seed polymer #2 were charged to a 5-liter reaction vessel and heated to 77° C. Initiator A was then added to the reaction vessel, followed by proportioning the monomer premix to the reaction vessel over a period of about 4 hours. About 45 minutes after premix proportioning, initiator B was proportioned into the reaction vessel over a period of about 4 hours and 30 minutes. After completion premix proportioning, a mixture of 18 grams of styrene and 2.9 grams of benzophenone was proportioned into the reaction vessel followed by with 126 grams of water flush. After completion of initiator B feed, the temperature of the reaction vessel was maintained at 81° C. for 60 minutes. The reaction vessel then was cooled to 57° C. A mixture of 5.62 grams of water, 2.57 grams of 70% t-butyl hydroperoxide, and 0.6 grams of 30% ammonium lauryl was added into the reaction vessel. After about 5 minutes, 39.2 grams of 8.25% sodium formaldehyde sulfoxylate solution was added to the reaction vessel. After 30 minutes, the reaction vessel was cooled to room temperature and filtered through 100-micron cloth. The pH of the product was adjusted to about 8.5 with ammonium hydroxide. 43.4 grams of 3.2% Proxel GXL solution was added as a preservative.

Example #9

2-EHA/MMA/AN/MAA/styrene=75/7/15/2/1

The emulsion polymer was made exactly the same as Example #8 except there was no benzophenone in this polymer.

Example #10

2-EHA/MMA/AN/MAA/styrene=75/9/13/2/1

The emulsion polymer was made exactly the same as Example #8 except the monomer composition was 2-EHA/MMA/AN/MAA/styrene=75/9/13/2/1.

Example #11

2-EHA/MMA/AN/MAA/styrene=75/12/10/2/1

The emulsion polymer was made exactly the same as Example #8 except the monomer composition was 2-EHA/MMA/AN/MAA/styrene=75/12/10/2/1.

TABLE 2

Solids, pH and Viscosity of Examples 1-11

| | Solid, wt % | pH | Brookfield viscosity, cps |
|---|---|---|---|
| Example #1 | 54.8 | 8.5 | 242 |
| Comparative Example #2 | 54.8 | 8.5 | 195 |
| Example #3 | 54 | 8.5 | 237 |
| Comparative Example #4 | 53.9 | 8.7 | 135 |
| Comparative Example #5 | 54.7 | 8.8 | 165 |
| Example #6 | 54.6 | 8.6 | 190 |
| Example #7 | 54.4 | 8.5 | 3200 |
| Example #8 | 54.1 | 8.1 | 725 |
| Example #9 | 54.1 | 8.2 | 600 |
| Example #10 | 55.1 | 8.2 | 1200 |
| Example #11 | 55 | 8.1 | 525 |
| U.S. Pat. No. 6,060,532, Example #5 | 54.6 | 5.1 | 68 |
| a Commercial Elastomeric latex | 50.5 | 8.0 | 350 |

TABLE 3

Recipe for Masonry Coating Testing

| Ingredients | % by weight |
|---|---|
| Water | 14.0 |
| Ethylene Glycol | 3.2 |
| Hydroxyethylcellulose thickener | 0.1 |
| Anionic polyacid dispersant | 0.9 |
| Polyethylene glycol nonylphenol ether surfactant | 0.5 |
| Paraffin oil based foam control agent | 0.6 |
| 2((hydroxymethyl)amino)-2-methyl propanol | 0.2 |
| Anhydrous calcined kaolin | 9.2 |
| Silicon dioxide - microcrystalline silica | 7.4 |
| Calcium carbonate | 5.5 |
| Titanium dioxide | 9.2 |
| 2,2,4-trimethyl-1,3pentanediol mono(2-methyl propanoate) | 1.8 |
| Water | 2.0 |
| Paraffin oil based foam control agent | 0.3 |
| Latex (1-11 or other) | 44.3 |
| Ammonia | 0.2 |
| Polyurethane rheology modifier | 0.1 |
| 3-Iodo-2-Propynyl butyl carbamate | 0.6 |
| Total Weight | 100.1 |

Dirt Pick-Up Resistance—Lab Procedure

Apply the coating specimen to an aluminum panel using an applicator with a 0.020-0.040 inch gap. Cure the film for 7 days at ambient conditions then cure for an additional 4 days in an accelerated weatherometer. Prepare a pigment slurry using brown iron oxide, water and a trace of dispersant, brush apply the pigment slurry to the cured film and allow to dry for 2 hours. Remove the stain by gently rubbing with a clean towel under running water. Allow the panel to dry completely before measuring the Y-Reflectance of the film before and after staining. Calculate the % change relative to a control coating. Values >100=better than control; <100=performance worse than then control. The control coating was a commercial masonry product believed to be formulated with Rhoplex™ 2438 latex from Rohm and Haas. A similar performing control for this test could be prepared using the composition of the coating in Table 4 using a commercial elastomeric latex.

Efflorescence Resistance—ASTM D7072-04

Prepare stucco cement mix (with pH >10.0) according to the manufacturers instructions. Apply a ¼" thick layer of the stucco mix by spatula or brush to a cementicious substrate. Allow the stucco mix to dry overnight. Apply tinted coating directly to the dried stucco surface and allow to dry overnight. Place test blocks face down in a circulating water bath set at 60° C. Do not cover or coat the back side of panels. Place a cover over the water bath. Monitor test panels for color change and efflorescence after 3, 5, 7, and 14 days. Rate blocks for degree of discoloration and surface deposits using a scale of 0-5 where 5=excellent, no discoloration or surface salt deposits.

Alkali Resistance

Cure a 1-2 inch square non-reinforced film with a dry film thickness of 0.010-0.020 inch thickness dry film thickness for 7 days at ambient condition, place the film in a vial and cover with 10% NaOH. Place the vial in a 120° F. oven and monitor for film degradation after 1, 3, and 5 days. Place each film in its own vial. Prepare a separate vial with water only as a control. Rate for film integrity, swelling, blistering, deterioration. A rating of pass=no change in film condition.

Elongation & Tensile Stress—ASTM D638-99

An non-reinforced film of 0.010-0.020 inch thickness is cured for 7 days at 77° F. and 50% relative humidity. Die cut each specimen using a type 4 dumbbell or one of similar dimension. Using an Instron™ or similar instrument with a constant rate of crosshead movement comprised of a stationary grip and a moveable grip. Measure the elongation and tensile stress of the film.

Example #12

Veova-10/2-EHA/MMA/ANI/MAA=30/45/13/10/2

A monomer premix was made by mixing 216 grams of water, 0.8 grams of ammonium carbonate, 8 grains of a sodium salt of tridecyl ether sulfate (Rhodaplex EST-30), 240 grams of Veova-, 360 grams of 2-ethylhexyl acrylate, 104 grams of methyl methacrylate, 80 grams of acrylonitrile, and 16 grams of methacrylic acid. Initiator A was made by dissolving 1.2 grams of ammonium persulfate in 8 grams of water. Initiator B was made by dissolving 2 grams of ammonium persulfate in 60 grams of water. About 248 grams of water and 51.8 grams of seed polymer #2 were charged to a 3-liter reaction vessel and heated to 78° C. Initiator A was then added to the reaction vessel, followed by proportioning the monomer premix to the reaction vessel over a period of about 4 hours. About 45 minutes after premix proportioning, initiator B was proportioned into the reaction vessel over a period of about 4 hours and 30 minutes. After completion premix proportioning, about 1.32 grams of liquid benzophenone (Photomer-81) was added into the reaction vessel followed by 30 grams of water flush. After completion of initiator B feed, the temperature of the reaction vessel was maintained at 82 C for 60 minutes. The reaction vessel then was cooled to 57° C. About 16.6 grams of 3.85% sodium formaldehyde sulfoxylate solution was added to the reaction vessel. After about 5 minutes, a mixture of 2.5 grams of water, 1.14 grains of 70% t-butyl hydroperoxide, and 0.27 grams of 30% ammonium lauryl was added into the reaction vessel. After 30 minutes, the reaction vessel was cooled to room temperature and filtered through 100-micron cloth. The pH of the product was adjusted to about 8.0 with ammonium hydroxide. About 4 grains of Acticide MV was added as a preservative. These latexes could be formulated in coatings as described in Tables 3 and 4.

The following emulsion polymers were made exactly same as Example #12 except the monomer compositions.

TABLE 4

Properties of Coating Formulated with Latex Examples 1-11

| | Alkali Resistance 120° C. 10 mil DFT | Efflorescence Resistance | Elongation, % | Dirt Pick-Up Resistance |
|---|---|---|---|---|
| Example #1 | Pass | 4 | 832 | 91 |
| Comparative Example #2 | Fail | 4 | 843 | 82 |
| Example #3 | Pass | 3 | 752 | 95 |
| Comparative Example #4 | Fail | n/a | 834 | |
| Comparative Example #5 | Fail | 3 | 648 | 110 |
| Example #6 | Pass | 4 | 822 | 102 |
| Example #7 | N/A | 5 | 539 | 102 |
| Example #8 | Fail | 4.5 | 837 | 108 |
| Example #9 | Fail | 4 | 584 | 99 |
| Example #10 | Pass | 4 | 787 | 111 |
| Example #11 | Pass | 4.5 | 538 | 100 |
| U.S. Pat. No. 6,060,532 Example 5 80 wt. % (90.7 BA/7 AN/2.3 MAA) 20 wt. % (18.7 BA/79 MMA/2.3 MAA) | Fail | 5 | 672 | 90 |
| Commercial Elastomeric Coating | Fail | 0 | 291 | 98 |

Example #13

Veova-10/2-EHA/BA/MMA/AN/MAA=30/10/35/13/10/2

Example #14

Veova-10/2-EHA/BA/MMA/AN/MAA=10/20/45/13/10/2

Example #15

Veova-10/2-EHA/BA/MMA/AN/MAA=10/40/25/13/10/2

Although only a few embodiments of this invention have been described above, it should be appreciated that many modifications can be made without departing from the spirit and scope of the invention. All such modifications can be included within the scope of the invention, which is to be limited only by the following claims. Patents cited for their teachings and enablements are hereby incorporated by reference.

The invention claimed is:

1. A coated masonry object comprising:
   a) a masonry substrate; and
   b) an elastomeric coating comprising a polymer from the polymerization of about 30 to 85 weight percent repeating units selected from C8 to C12 alkyl acrylate or vinyl esters of C10-C12 versatic acid monomers, from about 5 to 15 weight percent repeating units from acrylonitrile, less than 5 weight percent repeating units having mono or polycarboxylic acids, and from 0 to 65 weight percent repeating units from other copolymerizable monomers, wherein said polymer has a glass transition temperature of from −40 to about +10° C.

2. A coated masonry object according to claim 1, where said 30 to 85 weight percent repeating units are from C8-C12 alkyl acrylates.

3. A coated masonry object according to claim 1, wherein said elastomeric coating further comprises a UV activated species that promotes crosslinking of said elastomeric coating after film formation.

4. A coated masonry object according to claim 3, wherein said UV activated species comprises a photosensitive benzophenone group in an amount from about 0.01 to 2.0 wt.%.

5. A coated masonry object according to claim 1, wherein said elastomeric coating further comprises a silane coupling agent.

6. A coated masonry object according to claim 5, wherein said silane coupling agent includes at least one hydroxyl group or hydrolyzable alkoxy group and at least one group with a carbon to carbon double bond.

7. A coated masonry object according to claim 1, wherein said polymer comprises less than 5 weight percent styrene and other aromatic group containing monomers.

8. A coated masonry object according to claim 1, wherein said polymer comprises about 7 to 13 weight percent acrylonitrile.

9. A coated masonry object according to claim 1, wherein said polymer has a glass transition temperature from about −40 to 0° C.

10. A coated masonry object according to claim 1, wherein said polymer comprises at least 80 weight percent of the total binder in said elastomeric coating.

* * * * *